US008234908B2

(12) United States Patent
Korenaga et al.

(10) Patent No.: US 8,234,908 B2
(45) Date of Patent: Aug. 7, 2012

(54) APPARATUS FOR DETERMINING ABNORMAL COMBUSTION IN INTERNAL COMBUSTION ENGINE

(75) Inventors: Shingo Korenaga, Susono (JP); Shigeki Miyashita, Susono (JP); Hiroki Ito, Susono (JP); Yusuke Saitou, Susono (JP); Kouhei Kiyota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 116 days.

(21) Appl. No.: 13/000,033

(22) PCT Filed: May 28, 2010

(86) PCT No.: PCT/JP2010/059129

§ 371 (c)(1), (2), (4) Date: Dec. 20, 2010

(87) PCT Pub. No.: WO2011/148506

PCT Pub. Date: Dec. 1, 2011

(65) Prior Publication Data

US 2011/0290004 A1 Dec. 1, 2011

(51) Int. Cl.
*G01L 23/22* (2006.01)

(52) U.S. Cl. ...................................................... 73/35.01

(58) Field of Classification Search ................. 73/35.01, 73/35.03, 35.04, 35.06, 114.02

See application file for complete search history.

(56) References Cited

U.S. PATENT DOCUMENTS

| | | | | |
|---|---|---|---|---|
| 6,105,552 | A * | 8/2000 | Arisawa et al. | 123/406.37 |
| 7,603,981 | B2 * | 10/2009 | Tanaka | 123/406.3 |
| 7,832,260 | B2 * | 11/2010 | Tanaka | 73/114.38 |
| 2009/0031987 | A1 * | 2/2009 | Tanaka | 123/406.3 |
| 2011/0174055 | A1 * | 7/2011 | Amann et al. | 73/35.12 |

FOREIGN PATENT DOCUMENTS

| | | | |
|---|---|---|---|
| JP | 01-294933 | A | 11/1989 |
| JP | 08-028319 | A | 1/1996 |
| JP | 11-247750 | A | 9/1999 |
| JP | 2007-107458 | A | 4/2007 |
| JP | 2008-267245 | A | 11/2008 |

* cited by examiner

*Primary Examiner* — Freddie Kirkland, III

(74) *Attorney, Agent, or Firm* — Kenyon & Kenyon LLP

(57) ABSTRACT

An object is to provide an abnormal combustion determining apparatus for an internal combustion engine that can identify a major factor causing an oil to flow into a cylinder. The abnormal combustion determining apparatus for the internal combustion engine that includes a plurality of cylinders detects, for each cylinder, a cylinder in which abnormal combustion has occurred. The cylinder in which the abnormal combustion has occurred, and a history of load applied during an operation are stored in memory. It is determined whether or not the cylinder in which the abnormal combustion has occurred and which is stored in memory, is a specific cylinder. It is determined whether or not load present in the history stored in memory and used prior to the occurrence of the abnormal combustion is higher than a threshold value. Based on a combination of a decision made by the cylinder determining means and a decision made by the load determining means, a major factor causing the oil to flow into the cylinder is identified from among relations established for factors of oil flowing into the cylinder according to the combination of these decisions made.

12 Claims, 6 Drawing Sheets

APPARATUS FOR DETERMINING ABNORMAL COMBUSTION IN INTERNAL COMBUSTION ENGINE

This is a 371 national phase application of PCT/JP2010/059129 filed 28 May 2010, the content of which is incorporated herein by reference.

TECHNICAL FIELD

The present invention relates to an apparatus for determining abnormal combustion in an internal combustion engine.

BACKGROUND ART

An internal combustion engine having a knocking sensor is known, as disclosed, for example, in Patent Document 1. When the knocking sensor detects knocking, control is performed to retard ignition timing in order to bring the knocking to an end. This publication also discloses an abnormal combustion determining apparatus for an internal combustion engine that determines that pre-ignition has occurred if the control of retarding the ignition timing fails to end the knocking and it is found that, on comparison, an air-fuel ratio after retarding is smaller than that before the retarding.

PRIOR ART LITERATURE

Patent Document

Patent Document 1: JP-A-11-247750

SUMMARY OF THE INVENTION

Problem to be Solved by the Invention

Abnormal combustion may occur when an engine oil (hereinafter referred to simply as an "oil") flows into a cylinder. There are a number of factors that cause the oil to flow into the cylinder. To take appropriate action against the abnormal combustion, therefore, it is desirable that the factors be identified. The apparatus of the Patent Document 1 can, however, only determine that the abnormal combustion has occurred and is not able to identify the factor causing the oil to flow into the cylinder.

The present invention has been made to solve the foregoing problem and it is an object of the present invention to provide an abnormal combustion determining apparatus for an internal combustion engine that can identify a major factor causing an oil to flow into a cylinder.

Means for Solving the Problem

First aspect of the present invention is an apparatus for determining abnormal combustion in an internal combustion engine having a plurality of cylinders, comprising:

abnormal combustion detecting means for detecting, for each cylinder, a cylinder in which abnormal combustion has occurred;

abnormality occurring cylinder storage means for storing the cylinder in which abnormal combustion has occurred;

load history storage means for storing a history of load applied during an operation; and based on the cylinder stored in the abnormality occurring cylinder storage means and the history, major factor identifying means for identifying a major factor causing an oil to flow into the cylinder from among relations established for factors of oil flowing into the cylinder according to the abnormal combustion occurring cylinder and the load.

Second aspect of the present invention is an apparatus for determining abnormal combustion in the internal combustion engine according to the first aspect, comprising:

cylinder determining means for determining whether or not the cylinder stored in the abnormality occurring cylinder storage means is a specific cylinder; and load determining means for determining whether or not load present in the history and used prior to occurrence of the abnormal combustion is higher than a threshold value, wherein: based on a combination of a decision made by the cylinder determining means and a decision made by the load determining means, the major factor identifying means identifies a major factor causing an oil to flow into the cylinder from among relations established for factors of oil flowing into the cylinder according to the combination of the decision made by the cylinder determining means and the decision made by the load determining means.

Third aspect of the present invention is an apparatus for determining abnormal combustion in the internal combustion engine according to the second aspect, wherein: the major factor identifying means includes oil dropping identifying means which identifies a major factor causing an oil to flow into the cylinder as oil dropping when the cylinder stored in the abnormality occurring cylinder storage means is the specific cylinder and load present in the history and used prior to occurrence of the abnormal combustion is higher than the threshold value.

Fourth aspect of the present invention is an apparatus for determining abnormal combustion in the internal combustion engine according to the second or the third aspect, wherein: the major factor identifying means includes oil rising identifying means which identifies a major factor causing an oil to flow into the cylinder as oil rising when the cylinder stored in the abnormality occurring cylinder storage means is the specific cylinder and load present in the history and used prior to occurrence of the abnormal combustion is equal to or less than the threshold value.

Fifth aspect of the present invention is an apparatus for determining abnormal combustion in the internal combustion engine according to the second to the forth aspects, wherein: the major factor identifying means includes negative pressure-side blow-by identifying means which identifies a major factor causing an oil to flow into the cylinder as an oil contained in a negative pressure-side blow-by gas when the cylinder stored in the abnormality occurring cylinder storage means is unspecific cylinders and load present in the history and used prior to occurrence of the abnormal combustion is equal to or less than the threshold value.

Sixth aspect of the present invention is an apparatus for determining abnormal combustion in the internal combustion engine according to the second to the fifth aspects, wherein: the major factor identifying means includes atmosphere-side blow-by identifying means which identifies a major factor causing an oil to flow into the cylinder as an oil contained in an atmosphere-side blow-by gas when the cylinder stored in the abnormality occurring cylinder storage means is unspecific cylinders and load present in the history and used prior to occurrence of the abnormal combustion is higher than the threshold value.

Effects of the Invention

In the first aspect of the present invention, based on the cylinder stored in the abnormality occurring cylinder storage means and the history, the major factor causing the oil to flow into the cylinder can be identified from among the relations established for the factors of oil flowing into the cylinder according to the abnormal combustion occurring cylinder and the load.

In the second aspect of the present invention, based on the combination of the decision made by the cylinder determining means and the decision made by the load determining means, the major factor causing the oil to flow into the cylinder is identified from among the relations established for the factors of oil flowing into the cylinder according to the combination of the decision made by the cylinder determining means and the decision made by the load determining means. The aspect of the present invention therefore allows a maximum of four major factors to be identified by combining the two determining means.

In the third aspect of the present invention, the major factor causing the oil to flow into the cylinder can be identified as the oil dropping when the cylinder stored in the abnormality occurring cylinder storage means is the specific cylinder and the load present in the history and used prior to the occurrence of the abnormal combustion is higher than the threshold value. The aspect of the present invention therefore allows appropriate action to be taken against the oil dropping that causes the abnormal combustion to occur.

In the fourth aspect of the present invention, the major factor causing the oil to flow into the cylinder can be identified as the oil rising when the cylinder stored in the abnormality occurring cylinder storage means is the specific cylinder and the load present in the history and used prior to the occurrence of the abnormal combustion is equal to or less than the threshold value. The aspect of the present invention therefore allows appropriate action to be taken against the oil rising that causes the abnormal combustion to occur.

In the fifth aspect of the present invention, the major factor causing the oil to flow into the cylinder can be identified as the oil contained in the negative pressure-side blow-by gas when the cylinder stored in the abnormality occurring cylinder storage means is the unspecific cylinders and the load present in the history and used prior to the occurrence of the abnormal combustion is equal to or less than the threshold value. The aspect of the present invention therefore allows appropriate action to be taken against the negative pressure-side blow-by that causes the abnormal combustion to occur.

In the sixth aspect of the present invention, the major factor causing the oil to flow into the cylinder can be identified as the oil contained in the atmosphere-side blow-by gas when the cylinder stored in the abnormality occurring cylinder storage means is the unspecific cylinders and the load present in the history and used prior to the occurrence of the abnormal combustion is higher than the threshold value. The aspect of the present invention therefore allows appropriate action to be taken against the atmosphere-side blow-by that causes the abnormal combustion to occur.

Figure 1:
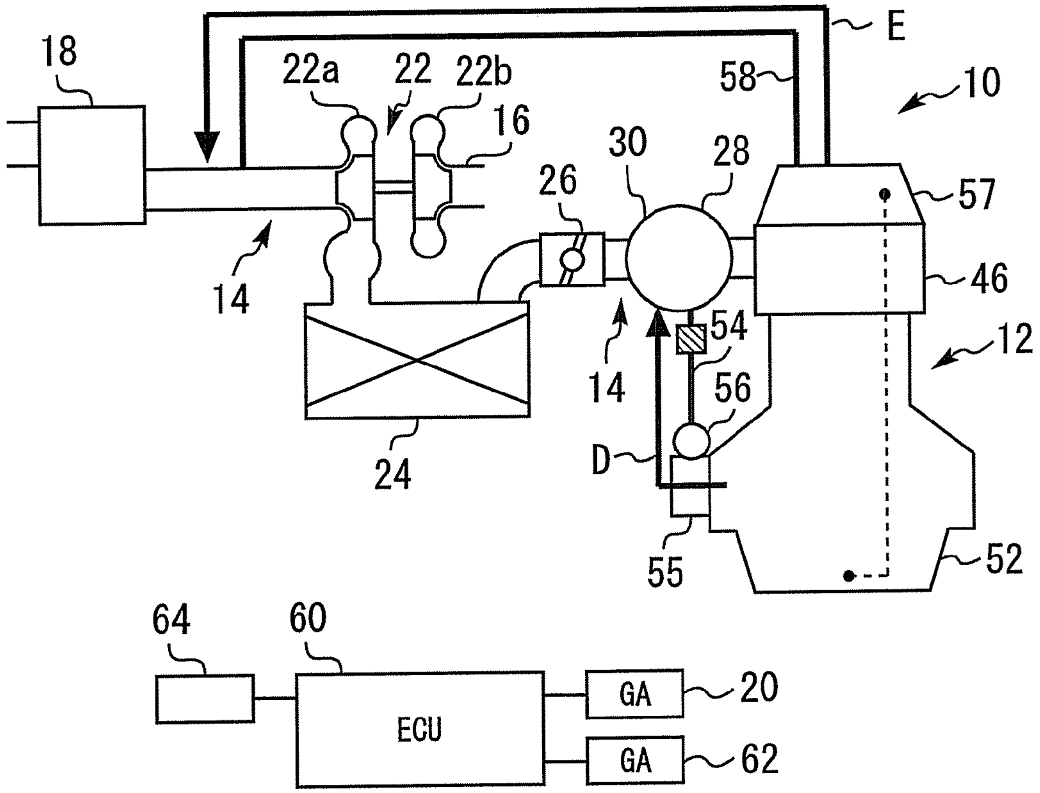
FIG. 1 is a schematic diagram for illustrating a system configuration of a first embodiment of the present invention.

10 engine
12 cylinder
14 intake passage
20 air flow meter
22, 22*a*, 22*b* turbocharger, compressor, turbine
26 throttle valve
28 intake manifold
30 surge tank
32 combustion chamber
34 intake valve
36 exhaust valve
42 piston
44 valve stem
48 valve stem guide
50 valve stem oil seal
52 crankcase
54 negative pressure-side blow-by gas flow-back passage
56 PCV valve
57 cylinder head cover
58 atmosphere-side blow-by gas flow-back passage
60 ECU (electronic control unit)
64 cylinder pressure sensor
66 piston ring
$\alpha$ threshold value

MODE FOR CARRYING OUT THE INVENTION

An embodiment of the present invention will now be described in detail with reference to the accompanying drawings. Like or corresponding parts are identified by the same reference numerals in all drawings and will not be redundantly described.

FIRST EMBODIMENT

System Configuration of the First Embodiment

FIG. 1 is a schematic diagram for illustrating a system configuration of a first embodiment of the present invention. The system shown in FIG. 1 includes an internal combustion engine (hereinafter referred to simply as an engine) 10. The engine 10 includes a plurality of cylinders 12. The present invention is not concerned with the number and layout of cylinders. An intake passage 14 and an exhaust passage 16 are connected to each of the cylinders 12.

An air cleaner 18 is disposed near an inlet of the intake passage 14. An air flow meter 20 is disposed downstream of the air cleaner 18. The air flow meter 20 outputs an intake air amount GA that corresponds to a flow rate of fresh air drawn into the intake passage 14.

A turbocharger 22 is disposed downstream of the air flow meter 20. The turbocharger 22 includes a compressor 22*a* and a turbine 22*b*. The compressor 22*a* and the turbine 22*b* are integrally connected with each other by a connecting shaft. The compressor 22*a* is rotatably driven by exhaust energy of an exhaust gas inputted to the turbine 22*b*.

An intercooler 24 is disposed downstream of the compressor 22*a*. The intercooler 24 cools fresh air compressed by the compressor 22*a*. A throttle valve 26 is disposed downstream of the intercooler 24.

An intake manifold 28 is disposed on the intake passage 14 disposed downstream of the throttle valve 26. A surge tank 30 is disposed upstream of the intake manifold 28. The intake manifold 28 has a downstream portion branching to be connected to each of the cylinders 12.

Figure 2:
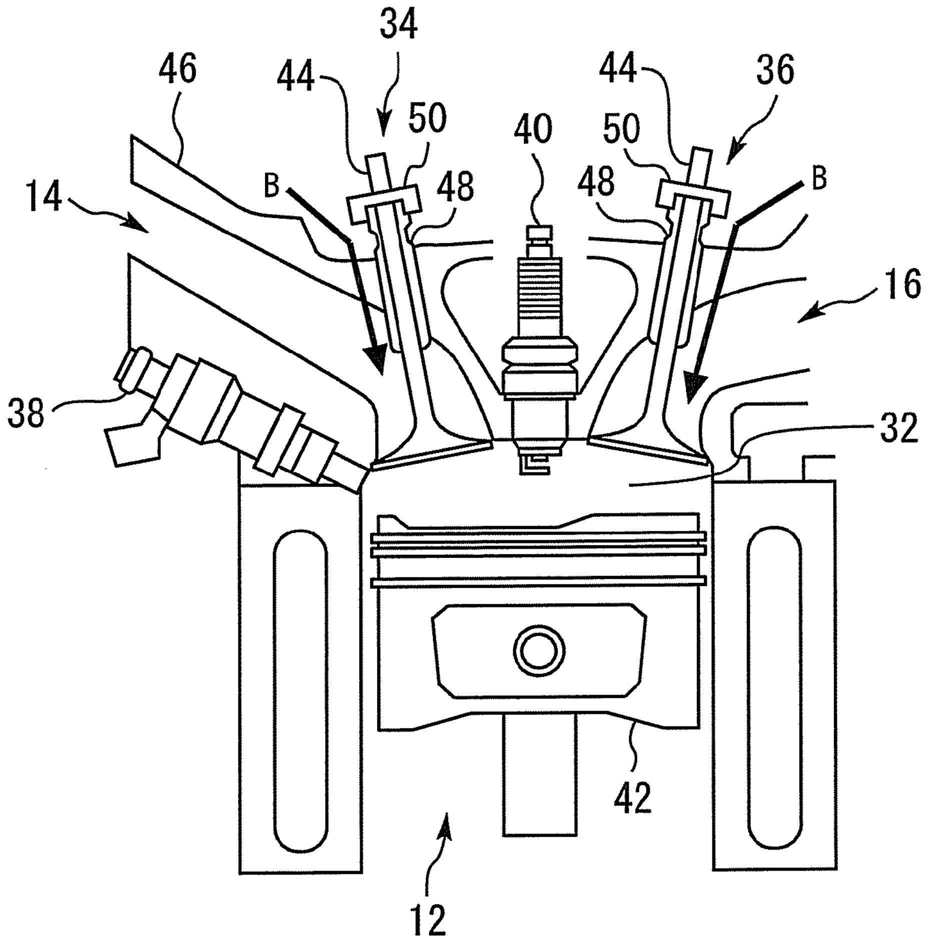
FIG. 2 is an illustration showing schematically arrangements of parts around the cylinder 12 shown in FIG. 1.

FIG. 2 is an illustration showing schematically arrangements of parts around the cylinder 12 shown in FIG. 1. The cylinder 12 includes an intake valve 34, an exhaust valve 36, an injector 38, an ignition plug 40, and a piston 42. The intake valve 34 opens and closes between the intake passage 14 and a combustion chamber 32. The exhaust valve 36 opens and closes between the exhaust passage 16 and the combustion chamber 32. Note that the injector 38 shown in FIG. 2 is structured to inject fuel directly into the cylinder; however, this is not the only possible arrangement and the injector 38 may be structured to inject fuel into an intake port.

The intake valve 34 has a valve stem 44 slidably supported by a valve stem guide 48 disposed in a cylinder head 46. A valve stem oil seal 50 is disposed between the valve stem 44 and the valve stem guide 48. The foregoing arrangements apply also to the side of the exhaust valve 36. The turbine 22*b* of the turbocharger 22 is disposed on the exhaust passage 16 on a downstream side of the exhaust valve 36.

The system of this embodiment further includes a blow-by gas reduction device (PCV: positive crankcase ventilation). A negative pressure-side blow-by gas flow-back passage 54 has a first end connected to a crankcase 52 shown in FIG. 1. An oil separator chamber 55 and a PCV valve 56 are disposed midway in the negative pressure-side blow-by gas flow-back passage 54. The negative pressure-side blow-by gas flow-back passage 54 has a second end connected to the surge tank 30.

An atmosphere-side blow-by gas flow-back passage 58 has a first end connected to a cylinder head cover 57. The atmosphere-side blow-by gas flow-back passage 58 has a second end connected to the intake passage 14 on an upstream side of the compressor 22*a*.

The system of this embodiment includes an ECU (electronic control unit) 60. Various types of sensors, which include the air flow meter 20 mentioned earlier, a crank angle sensor 62 that outputs a signal CA corresponding to a rotating angle of a crankshaft, and a cylinder pressure sensor 64 for detecting a cylinder pressure, are connected to an input section of the ECU 60. Various types of actuators, including the throttle valve 26, the injector 38, and the ignition plug 40 described earlier, are connected to an output section of the ECU 60. Based on an output from each of the sensors, the ECU 60 actuates a corresponding actuator in accordance with a predetermined program to thereby control an operating state of the engine 10. The ECU 60 can calculate an engine speed NE from the signal CA from the crank angle sensor 62.

Ideal fuel economy or drivability is normally achieved when the engine 10 is used in accordance with an optimum operation line. For reasons such as, for example, changes with time, however, abnormal combustion can occur if an engine oil (hereinafter referred to simply as an "oil") in amount equal to or more than a design value flows into the cylinder. Such abnormal combustion tends to occur at a high rpm range under light load.

If the high rpm range under light load is used for the optimum operation line, avoiding the use of the high rpm range under light load to thereby prevent the abnormal combustion from occurring degrades acceleration performance, thus aggravating drivability. Avoiding the use of the optimum operation line aggravates fuel economy.

To enable the use of the optimum operation line after occurrence of the abnormal combustion, it becomes necessary to take appropriate action to reduce the oil flowing into the cylinder. However, in order to take the appropriate action, a major factor causing the oil to flow into the cylinder must first be correctly identified. If the factor is wrongly identified, wrong action is to be taken, leading to aggravated drivability or fuel economy.

Characteristic Processes in the First Embodiment

In the system of this embodiment, therefore, a factor relating to the oil in the abnormal combustion is to be identified. Each of first through fourth processes which the system of this embodiment performs in order to identify the major factor causing the oil to flow into the cylinder will be described below.

(First Process: Oil Dropping)

A first process will first be described. The first process is to identify the abnormal combustion due mainly to oil dropping. Under heavy load, a boost pressure becomes higher than an internal pressure of the cylinder head cover 57. Consequently, a gas blows from the cylinder toward the side of the cylinder head 46. If the valve stem oil seal 50 has a reduced sealing force due, for example, to changes with time, an oil flows from the side of the cylinder head 46 into the cylinder, which is the oil dropping (an arrow B in FIG. 2). Note that the valve stem oil seal 50 is disposed independently for each cylinder, so that the abnormal combustion due to the oil dropping occurs in a specific cylinder, in which the valve stem oil seal 50 has a reduced sealing force.

In the first process, therefore, if heavy load is heavily used before abnormal combustion occurs and the abnormal combustion occurs in a specific cylinder, the major factor relating to the oil in the abnormal combustion is to be identified as oil dropping.

(Second Process: Oil Rising)

Figure 3:
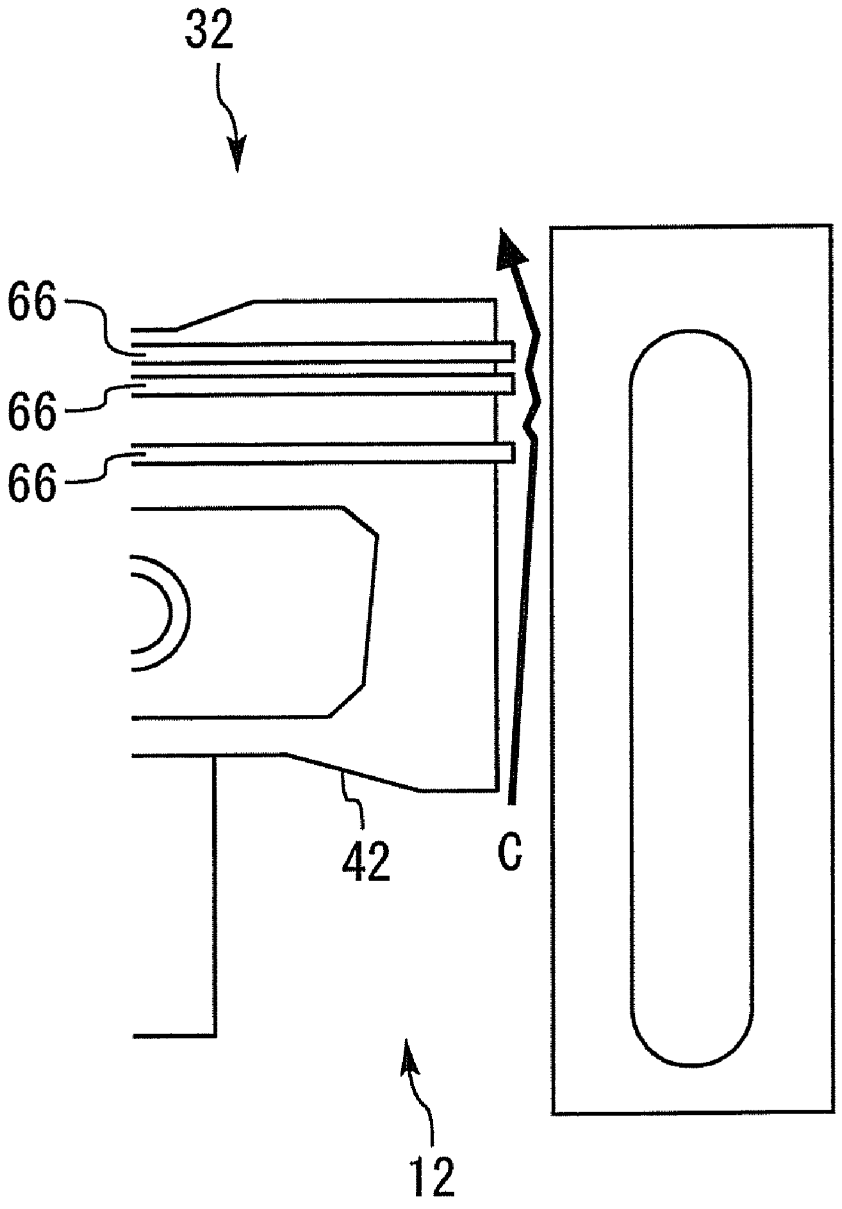
FIG. 3 is an enlarged view showing a sliding portion between the piston 42 and the cylinder 12 shown in FIG. 2.

A second process is to identify the abnormal combustion due mainly to oil rising. FIG. 3 is an enlarged view showing a sliding portion between the piston 42 and the cylinder 12 shown in FIG. 2. Normally, an excess oil is scraped off by piston rings 66. When a tension of the piston rings 66 becomes small due to, for example, wear, an oil tends to flow into the cylinder. Specifically, the cylinder pressure during air intake is close to an internal pressure of the surge tank 30. The cylinder pressure is therefore negative under light load. In contrast, the internal pressure of the crankcase 52 is close to the atmospheric pressure. Consequently, if the tension of the piston rings 66 becomes small, an oil flows from the side of the crankcase 52 into the cylinder, which is the oil rising (an arrow C in FIG. 3). Note that the piston 42 is disposed independently for each cylinder, so that the abnormal combustion due to the oil rising occurs in a specific cylinder, in which the tension of the piston rings 66 becomes small.

In the second process, therefore, if light load is heavily used before abnormal combustion occurs and the abnormal combustion occurs in a specific cylinder, the major factor relating to the oil in the abnormal combustion is to be identified as oil rising.

(Third Process: Blow-by on a Negative Pressure Side)

A third process is to identify the abnormal combustion due mainly to a negative pressure-side blow-by, in which a blow-by gas flows back through the negative pressure-side blow-by gas flow-back passage 54. Under light load, the internal pressure of the surge tank 30 is negative. By contrast, the internal pressure of the crankcase 52 is close to the atmospheric pressure. Consequently, a flow-back condition through the negative pressure-side blow-by gas flow-back passage 54 (crankcase internal pressure−surge tank pressure>0) holds true. The blow-by gas therefore flows from the side of the crankcase 52 back to the side of the surge tank 30 as shown by an arrow D of FIG. 1. Oil contained in the flowing-back negative pressure-side blow-by gas accumulates in an intake system. The oil that has accumulated in the intake system thereafter flows into the cylinder, causing abnormal combustion. Note that the surge tank 30 is shared among the cylinders, so that the abnormal combustion due to the negative pressure-side blow-by occurs in unspecific cylinders.

In the third process, therefore, if light load is heavily used before abnormal combustion occurs and the abnormal combustion occurs in unspecific cylinders, the major factor relating to the oil in the abnormal combustion is to be identified as an oil contained in the negative pressure-side blow-by gas.

(Fourth Process: Blow-by on the Atmosphere Side)

A fourth process is to identify the abnormal combustion due mainly to an atmosphere-side blow-by, in which a blow-by gas flows back through the atmosphere-side blow-by gas flow-back passage 58. The system of this embodiment having the turbocharger 22 has a wide load range, in which the crankcase 52 internal pressure−the surge tank 30 internal pressure<0, when the engine is turbocharged. Under heavy load, therefore, the blow-by gas does not flow back through the negative pressure-side blow-by gas flow-back passage 54. In this case, a flow-back condition through the atmosphere-side blow-by gas flow-back passage 58 (crankcase 52 internal pressure−atmospheric pressure>0) holds true. The blow-by gas therefore flows from the side of the crankcase 52 back to the side of the intake passage 14 on the upstream side of the compressor 22*a* as shown by an arrow E of FIG. 1. Oil contained in the flowing-back atmosphere-side blow-by gas accumulates in the intake system. The oil that has accumulated in the intake system thereafter flows into the cylinder, causing abnormal combustion. Note that the intake passage 14 is shared among the cylinders, so that the abnormal combustion due to the atmosphere-side blow-by occurs in unspecific cylinders.

In the fourth process, therefore, if heavy load is heavily used before abnormal combustion occurs and the abnormal combustion occurs in unspecific cylinders, the major factor relating to the oil in the abnormal combustion is to be identified as an oil contained in the atmosphere-side blow-by gas.

Figure 4:
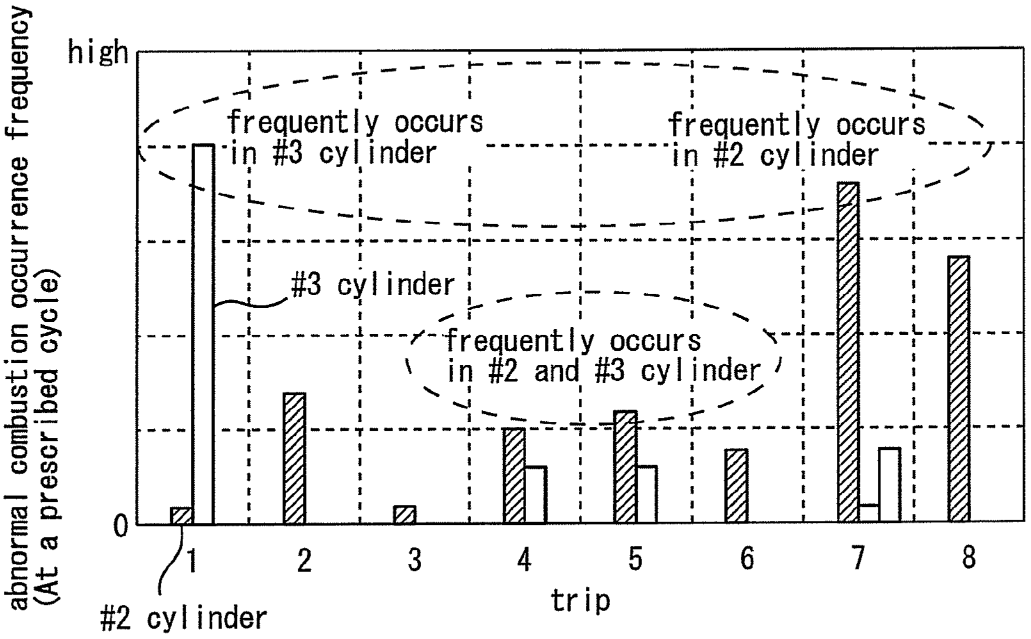
FIG. 4 is a map for storing in memory the cylinders in which the abnormal combustion has occurred, and the number of occurrence thereof according to a first embodiment of the present invention.
Figure 5:
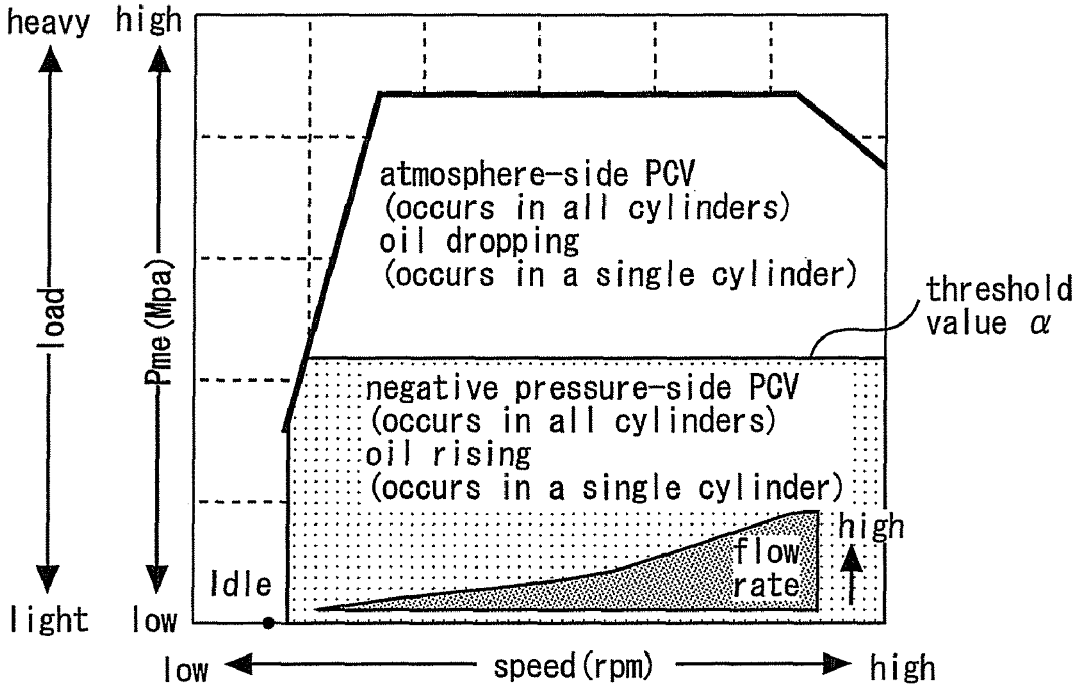
FIG. 5 is a map for storing in memory speed, load, and time during operation according to a first embodiment of the present invention.

Specific examples for identifying the major factor relating to the oil in the abnormal combustion through the first to fourth processes described above will be described below. FIG. 4 is a map for storing in memory the cylinders in which the abnormal combustion has occurred, and the number of occurrence thereof. The map shown in FIG. 4 stores the cylinders in which the abnormal combustion has occurred, associated with frequency of occurrence thereof. FIG. 5 is a map for storing in memory speed, load, and time during operation. A history of, for example, load is plotted on FIG. 5 in sequence. The first through fourth processes identify, from these types of stored data, the major factors causing the oil to flow into the cylinder.

If, for example, the abnormal combustion frequently occurs in a particular cylinder (e.g. a single cylinder) as shown in trips 1 and 7 of FIG. 4, it is known that the factor is either the oil dropping or the oil rising. Further, from the history of FIG. 5, the major factor can be identified as the oil dropping (the first process) if heavy load is frequently used before the abnormal combustion occurs. On the other hand, if light load is frequently used before the abnormal combustion occurs, the major factor can be identified as the oil rising (the second process).

If the abnormal combustion occurs in unspecific cylinders (e.g. multiple cylinders) as shown in trips 4 and 5 of FIG. 4, it is known that the factor is either the negative pressure-side blow-by or the atmosphere-side blow-by. Further, from the history of FIG. 5, the major factor can be identified as the negative pressure-side blow-by (the third process) if light load is frequently used before the abnormal combustion occurs. On the other hand, if heavy load is frequently used before the abnormal combustion occurs, the major factor can be identified as the atmosphere-side blow-by (the fourth process).

(Abnormal Combustion Major Factor Determining Routine)

Figure 6:
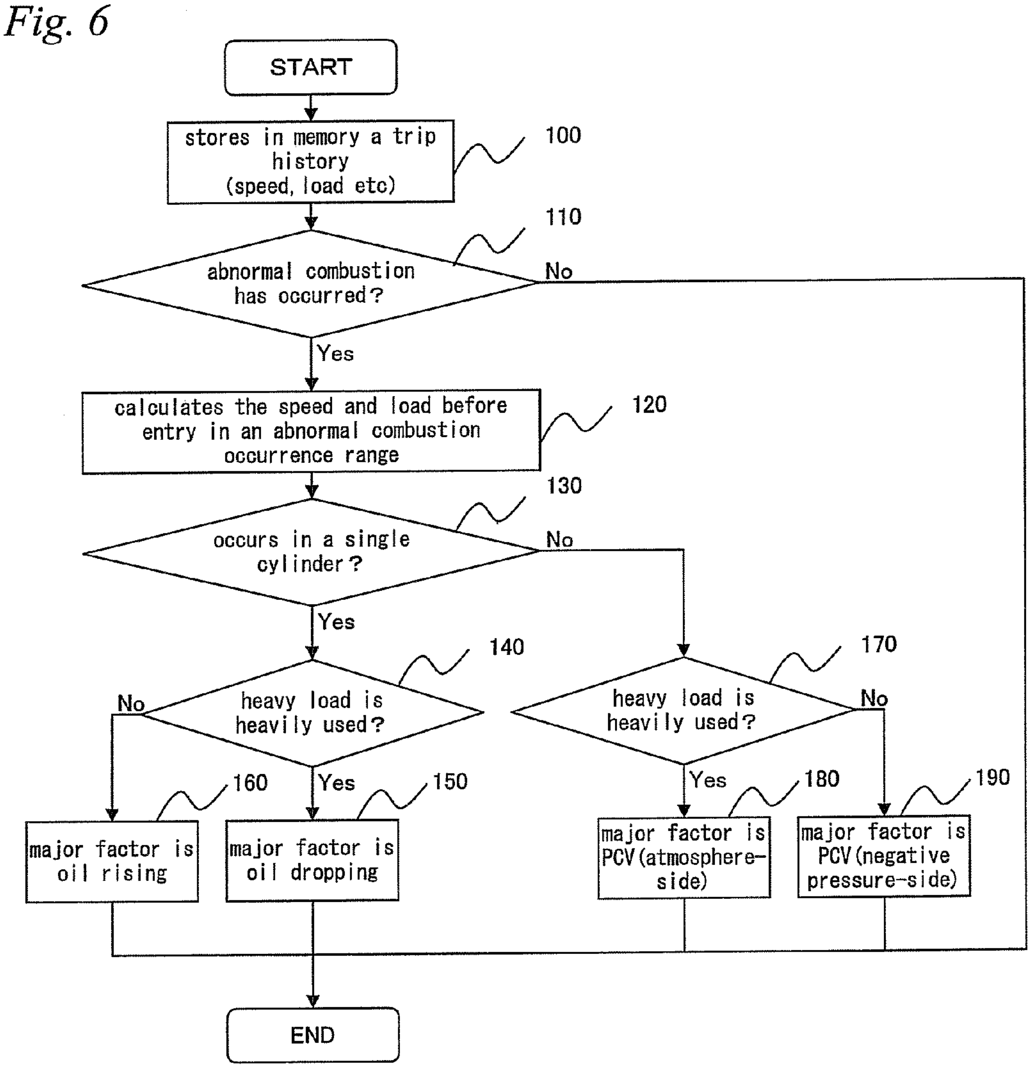
FIG. 6 is a flow chart showing a routine which the ECU 60 performs for determining the major factor in the abnormal combustion according to a first embodiment of the present invention.

FIG. 6 is a flow chart showing a routine which the ECU 60 performs for determining the major factor in the abnormal combustion in order to achieve the above-described operations. In the routine shown in FIG. 6, the ECU 60 stores in memory a trip history in step 100. For example, the ECU 60 stores in a map corresponding to that of FIG. 4 the cylinders in which the abnormal combustion has occurred, associated with the number of occurrence thereof (or probability). Also stored in a map corresponding to that of FIG. 5 is a history of the load and the engine speed NE during the operation. The load can be estimated from, for example, the engine speed NE and the intake air amount GA. The ECU 60 determines that, if a combustion pressure detected by the cylinder pressure sensor 64 exceeds a predetermined value, the abnormal combustion has occurred in that particular cylinder. The operation of step 100 is repeatedly performed until a predetermined number of samples are reached.

After that, in step 110, the ECU 60 determines whether or not the abnormal combustion has occurred. Specifically, the ECU 60 first acquires, from the trip history stored in step 100, the number of occurrence of the abnormal combustion (or probability) for each cylinder. If the number of occurrence of the abnormal combustion (or probability) is greater than a reference value for at least one cylinder, it is determined that the abnormal combustion has occurred. If it is determined that the abnormal combustion has not occurred, the operation of this routine is terminated.

If it is determined in step 110 that the abnormal combustion has occurred, the ECU 60 next calculates the speed and load before entry in an abnormal combustion occurrence range (step 120). Specifically, the ECU 60 calculates, from the trip history stored in step 100, which specific speed and load are heavily used within a predetermined period of time before the abnormal combustion occurs. For example, the ECU 60 calculates an average speed and an average load in the predetermined period of time before the abnormal combustion occurs.

Then in step 130, the ECU 60 determines, from the trip history stored in step 100, whether or not the abnormal combustion occurs in a specific cylinder (e.g. a single cylinder). If it is determined that the abnormal combustion occurs in a specific cylinder, the ECU 60 subsequently determines, in step 140, whether or not heavy load is heavily used prior to the occurrence of the abnormal combustion. Specifically, the ECU 60 determines that heavy load is heavily used, if the load calculated in step 120 is higher than a threshold value $\alpha$ (FIG. 5) and that light load is heavily used, if the load calculated in step 120 is equal to or less than the threshold value $\alpha$ (FIG. 5).

If it is determined in step 140 that heavy load is heavily used, the ECU 60 then determines that the major factor causing the oil to flow into the cylinder is the oil dropping (step 150). The ECU 60 turns ON a flag indicating that the major factor relating to the oil in the abnormal combustion is the oil dropping. The operation of this routine is thereafter terminated.

If it is determined in step 140, on the other hand, that light load is heavily used, the ECU 60 then determines that the major factor causing the oil to flow into the cylinder is the oil rising (step 160). The ECU 60 turns ON a flag indicating that the major factor relating to the oil in the abnormal combustion is the oil rising. The operation of this routine is thereafter terminated.

If it is determined in step 130 that the abnormal combustion occurs in unspecific cylinders (e.g. multiple cylinders), the ECU 60 subsequently determines, in step 170, whether or not heavy load is heavily used prior to the occurrence of the abnormal combustion. Specifically, the ECU 60 determines that heavy load is heavily used, if the load calculated in step 120 is higher than the threshold value α (FIG. 5) and that light load is heavily used, if the load calculated in step 120 is equal to or less than the threshold value α (FIG. 5).

If it is determined in step 170 that heavy load is heavily used, the ECU 60 then determines that the major factor causing the oil to flow into the cylinder is the oil contained in the atmosphere-side blow-by gas (step 180). The ECU 60 turns ON a flag indicating that the major factor relating to the oil in the abnormal combustion is the oil contained in the atmosphere-side blow-by gas. The operation of this routine is thereafter terminated.

If it is determined in step 170, on the other hand, that light load is heavily used, the ECU 60 then determines that the major factor causing the oil to flow into the cylinder is the oil contained in the negative pressure-side blow-by gas (step 190). The ECU 60 turns ON a flag indicating that the major factor relating to the oil in the abnormal combustion is the oil contained in the negative pressure-side blow-by gas. The operation of this routine is thereafter terminated.

As described heretofore, in accordance with the routine shown in FIG. 6, the above-described four major factors relating to the oil in the abnormal combustion can be identified by combining the process of determining whether the abnormal combustion occurs in a specific cylinder or unspecific cylinders and the process of determining whether the load heavily used prior to the occurrence of the abnormal combustion is higher or lower than the threshold value α. In addition, appropriate action can be taken, in other routines, for the major factors identified in this routine.

The system of the first embodiment described above determines the major factors causing the oil to flow into the cylinder by combining all of the four processes of from the first through fourth processes described above. The first through fourth processes may, nonetheless, be performed singly or in groups of two or more.

Additionally, in the system of the first embodiment described above, the specific cylinder is a single cylinder. This is, however, not the only possible requirement. The specific cylinder may be a plurality of cylinders as long as the frequency of occurrence of the abnormal combustion can be differentiated from that of any other cylinders than the plurality of cylinders.

In addition, the system of the first embodiment described above determines the occurrence of the abnormal combustion based on the combustion pressure detected by the cylinder pressure sensor 64. This is, however, not the only possible arrangement. For example, a knocking sensor may be employed instead of the cylinder pressure sensor and the occurrence of the abnormal combustion may be determined based on a knocking level detected by the knocking sensor.

In the first embodiment described above, the ECU 60 performs different operations of steps to achieve respective means in the first to sixth aspects of the present invention as follows. Specifically, the ECU 60 performs: the operation of step 100 to achieve the "abnormal combustion detecting means", the "abnormality occurring cylinder storage means", and the "load history storage means" in the first aspect of the present invention; the operations of the steps 110 to 190 to achieve the "major factor identifying means" in the first aspect of the present invention; the operation of step 130 to achieve the "cylinder determining means" in the second aspect of the present invention; the operation of step 140 or step 170 to achieve the "load determining means" in the second aspect of the present invention; the operation of step 150 to achieve the "oil dropping identifying means" in the third aspect of the present invention; the operation of step 160 to achieve the "oil rising identifying means" in the fourth aspect of the present invention; the operation of step 190 to achieve the "negative pressure-side blow-by identifying means" in the fifth aspect of the present invention; the operation of step 180 to achieve the "atmosphere-side blow-by identifying means" in the sixth aspect of the present invention, respectively.

Furthermore, in the first embodiment, the factors causing the oil to flow into the cylinder (steps 150, 160, 180, and 190) determined according to the combination of a cylinder decision made by the operation of step 130 and a load decision made by the operations of steps 140 and 170 correspond to the "relation" in the first and second aspects of the present invention, respectively.

The invention claimed is:

1. An apparatus for determining abnormal combustion in an internal combustion engine having a plurality of cylinders, comprising:

abnormal combustion detecting means for detecting, for each cylinder, a cylinder in which abnormal combustion has occurred;

abnormality occurring cylinder storage means for storing the cylinder in which abnormal combustion has occurred;

load history storage means for storing a history of load applied during an operation; and based on the cylinder stored in the abnormality occurring cylinder storage means and the history, major factor identifying means for identifying a major factor causing an oil to flow into the cylinder from among relations established for factors of oil flowing into the cylinder according to the abnormal combustion occurring cylinder and the load.

2. The apparatus for determining the abnormal combustion in the internal combustion engine according to claim 1, further comprising:

cylinder determining means for determining whether or not the cylinder stored in the abnormality occurring cylinder storage means is a specific cylinder; and load determining means for determining whether or not load present in the history and used prior to occurrence of the abnormal combustion is higher than a threshold value, wherein: based on a combination of a decision made by the cylinder determining means and a decision made by the load determining means, the major factor identifying means identifies a major factor causing an oil to flow into the cylinder from among relations established for factors of oil flowing into the cylinder according to the combination of the decision made by the cylinder determining means and the decision made by the load determining means.

3. The apparatus for determining the abnormal combustion in the internal combustion engine according to claim 2, wherein: the major factor identifying means includes oil dropping identifying means which identifies a major factor causing an oil to flow into the cylinder as oil dropping when the cylinder stored in the abnormality occurring cylinder storage means is the specific cylinder and load present in the history and used prior to occurrence of the abnormal combustion is higher than the threshold value.

4. The apparatus for determining the abnormal combustion in the internal combustion engine according to claim 2, wherein: the major factor identifying means includes oil rising identifying means which identifies a major factor causing an oil to flow into the cylinder as oil rising when the cylinder stored in the abnormality occurring cylinder storage means is the specific cylinder and load present in the history and used prior to occurrence of the abnormal combustion is equal to or less than the threshold value.

5. The apparatus for determining the abnormal combustion in the internal combustion engine according to claim 2, wherein: the major factor identifying means includes negative pressure-side blow-by identifying means which identifies a major factor causing an oil to flow into the cylinder as an oil contained in a negative pressure-side blow-by gas when the cylinder stored in the abnormality occurring cylinder storage means is an unspecific cylinder and load present in the history and used prior to occurrence of the abnormal combustion is equal to or less than the threshold value.

6. The apparatus for determining the abnormal combustion in the internal combustion engine according to claim 2, wherein: the major factor identifying means includes atmosphere-side blow-by identifying means which identifies a major factor causing an oil to flow into the cylinder as an oil contained in an atmosphere-side blow-by gas when the cylinder stored in the abnormality occurring cylinder storage means is an unspecific cylinder and load present in the history and used prior to occurrence of the abnormal combustion is higher than the threshold value.

7. An apparatus for determining abnormal combustion in an internal combustion engine having a plurality of cylinders, comprising:

an abnormal combustion detecting device for detecting, for each cylinder, a cylinder in which abnormal combustion has occurred;

an abnormality occurring cylinder storage device for storing the cylinder in which abnormal combustion has occurred;

a load history storage device for storing a history of load applied during an operation; and based on the cylinder stored in the abnormality occurring cylinder storage device and the history, a major factor identifying device for identifying a major factor causing an oil to flow into the cylinder from among relations established for factors of oil flowing into the cylinder according to the abnormal combustion occurring cylinder and the load.

8. The apparatus for determining the abnormal combustion in the internal combustion engine according to claim 7, further comprising:

a cylinder determining device for determining whether or not the cylinder stored in the abnormality occurring cylinder storage device is a specific cylinder; and a load determining device for determining whether or not load present in the history and used prior to occurrence of the abnormal combustion is higher than a threshold value, wherein: based on a combination of a decision made by the cylinder determining device and a decision made by the load determining device, the major factor identifying device identifies a major factor causing an oil to flow into the cylinder from among relations established for factors of oil flowing into the cylinder according to the combination of the decision made by the cylinder determining device and the decision made by the load determining device.

9. The apparatus for determining the abnormal combustion in the internal combustion engine according to claim 8, wherein: the major factor identifying device includes an oil dropping identifying device which identifies a major factor causing an oil to flow into the cylinder as oil dropping when the cylinder stored in the abnormality occurring cylinder storage device is the specific cylinder and load present in the history and used prior to occurrence of the abnormal combustion is higher than the threshold value.

10. The apparatus for determining the abnormal combustion in the internal combustion engine according to claim 8, wherein: the major factor identifying device includes an oil rising identifying device which identifies a major factor causing an oil to flow into the cylinder as oil rising when the cylinder stored in the abnormality occurring cylinder storage device is the specific cylinder and load present in the history and used prior to occurrence of the abnormal combustion is equal to or less than the threshold value.

11. The apparatus for determining the abnormal combustion in the internal combustion engine according to claim 8, wherein: the major factor identifying device includes a negative pressure-side blow-by identifying device which identifies a major factor causing an oil to flow into the cylinder as an oil contained in a negative pressure-side blow-by gas when the cylinder stored in the abnormality occurring cylinder storage device is an unspecific cylinder and load present in the history and used prior to occurrence of the abnormal combustion is equal to or less than the threshold value.

12. The apparatus for determining the abnormal combustion in the internal combustion engine according to claim 8, wherein: the major factor identifying device includes an atmosphere-side blow-by identifying device which identifies a major factor causing an oil to flow into the cylinder as an oil contained in an atmosphere-side blow-by gas when the cylinder stored in the abnormality occurring cylinder storage device is an unspecific cylinder and load present in the history and used prior to occurrence of the abnormal combustion is higher than the threshold value.

* * * * *